US010465715B2

(12) United States Patent
Pollack

(10) Patent No.: US 10,465,715 B2
(45) Date of Patent: Nov. 5, 2019

(54) BLADE WITH DAMPING STRUCTURES

(71) Applicant: GOODRICH CORPORATION, Charlotte, NC (US)

(72) Inventor: Thomas A. Pollack, St. Augustine, FL (US)

(73) Assignee: GOODRICH CORPORATION, Charlotte, NC (US)

(*) Notice: Subject to any disclaimer, the term of this patent is extended or adjusted under 35 U.S.C. 154(b) by 171 days.

(21) Appl. No.: 15/787,450

(22) Filed: Oct. 18, 2017

(65) Prior Publication Data

US 2019/0113052 A1 Apr. 18, 2019

(51) Int. Cl.
*F04D 29/66* (2006.01)
*F04D 29/38* (2006.01)
*B64C 11/00* (2006.01)
*F01D 5/14* (2006.01)
*F01D 5/16* (2006.01)
*F04D 29/02* (2006.01)
(Continued)

(52) U.S. Cl.
CPC .......... *F04D 29/668* (2013.01); *B64C 11/008* (2013.01); *F01D 5/147* (2013.01); *F01D 5/16* (2013.01); *F04D 29/023* (2013.01); *F04D 29/324* (2013.01); *F04D 29/388* (2013.01); *F01D 5/26* (2013.01); *F02K 3/06* (2013.01); *F04D 19/002* (2013.01); *F05D 2230/30* (2013.01); *F05D 2230/40* (2013.01); *F05D 2300/43* (2013.01); *F05D 2300/603* (2013.01)

(58) Field of Classification Search
CPC ... F01D 5/147; F01D 5/16; F01D 5/26; F04D 19/002; F04D 29/023; F04D 29/324; F04D 29/388; F04D 29/668; B64C 11/008; F02K 3/06; F05D 2230/30; F05D 2230/40; F05D 2300/43; F05D 2300/603
See application file for complete search history.

(56) References Cited

U.S. PATENT DOCUMENTS 5,295,789 A * 3/1994 Daguet .................. B64C 11/22
415/200
5,947,688 A * 9/1999 Schilling ................ F01D 5/147
416/233
(Continued)

FOREIGN PATENT DOCUMENTS

DE 102008031329 1/2010
EP 0764763 3/1997
(Continued)

OTHER PUBLICATIONS

European Patent Office, European Search Report dated Apr. 1, 2019 in Application No. 18200463.0.

*Primary Examiner* — Igor Kershteyn
(74) *Attorney, Agent, or Firm* — Snell & Wilmer, L.L.P.

(57) ABSTRACT

A blade of a gas turbine engine may comprise a cavity defined, at least partially, by a first interior surface of the blade and by a second interior surface of the blade. A first rib and a second rib may extend from the first interior surface. A third rib may extend from the second interior surface and may be located between the first rib and the second rib. A bulkhead rib may traverse the cavity and may separate the cavity into a radially inward portion and a radially outward portion. A viscoelastic material may be disposed in the radially inward portion of the cavity.

21 Claims, 11 Drawing Sheets

(51) Int. Cl.
*F04D 29/32* (2006.01)
*F02K 3/06* (2006.01)
*F04D 19/00* (2006.01)
*F01D 5/26* (2006.01)

(56) References Cited

U.S. PATENT DOCUMENTS

| | | | | |
|---|---|---|---|---|
| 6,033,186 | A * | 3/2000 | Schilling | B63H 1/26 |
| | | | | 416/233 |
| 6,039,542 | A * | 3/2000 | Schilling | F01D 5/16 |
| | | | | 416/224 |
| 6,287,080 | B1 * | 9/2001 | Evans | B29C 39/10 |
| | | | | 415/200 |
| 8,083,489 | B2 * | 12/2011 | Viens | F01D 5/147 |
| | | | | 416/229 A |
| 8,821,124 | B2 * | 9/2014 | Viens | F01D 5/147 |
| | | | | 416/191 |
| 8,857,054 | B2 | 10/2014 | Goldfinch et al. | |
| 9,074,482 | B2 * | 7/2015 | Propheter-Hinckley | |
| | | | | F04D 29/324 |
| 10,309,226 | B2 * | 6/2019 | Surace | F01D 5/147 |
| 2012/0313307 | A1 | 12/2012 | Cartwright | |
| 2019/0112931 | A1 * | 4/2019 | Malmborg | F01D 5/16 |

FOREIGN PATENT DOCUMENTS

| | | |
|---|---|---|
| EP | 0926312 | 6/1999 |
| EP | 1077126 | 2/2001 |
| GB | 2264755 | 9/1993 |

* cited by examiner

BLADE WITH DAMPING STRUCTURES

FIELD

The present disclosure relates to gas turbine engines, and, more specifically, to a fan blade with damping structures.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The fan section, compressor section, and turbine section typically include a series of rotor systems. Rotor systems typically include a disk and a plurality of circumferentially spaced blades. Hollow blades may advantageously reduce the weight associated with the larger blades. To increase a strength of the hollow blade, a series of ribs may extend between opposing interior surfaces of the blade. At various operating frequencies the blades may experience increased vibration and/or blade flutter due to the natural resonant modes of the blade structure. Increased vibration and/or blade flutter may lead to increased blade fatigue and/or increased noise.

SUMMARY

A blade is described herein, in accordance with various embodiments. The blade may comprise a blade body. The blade body may comprise a cavity defined, at least partially, by a first interior surface of the blade body and by a second interior surface of the blade body opposite the first interior surface of the blade body. The blade body may further comprise a first rib extending from the first interior surface of the blade body, a second rib extending from the first interior surface of the blade body, and a third rib extending from the second interior surface of the blade body. The third rib may be located between the first rib and the second rib. The blade body may further comprise a bulkhead rib traversing the cavity. The bulkhead rib may separate a radially inward portion of the cavity from a radially outward portion of the cavity. A viscoelastic material may be disposed in the radially inward portion of the cavity.

In various embodiments, the first rib and the second rib may terminate prior to the second interior surface, and the third rib may terminate prior to the first interior surface. The first rib, the second rib, and the third rib may be radially inward of the bulkhead rib.

In various embodiments, the blade body may further comprise a fourth rib contacting the first interior surface and the second interior surface. The fourth rib may be radially outward of the bulkhead rib.

In various embodiments, the blade body may further comprise a fourth rib contacting the first interior surface and the second interior surface. The fourth rib may be radially inward of the bulkhead rib.

In various embodiments, the cavity may comprise a length extending from a radially outward facing interior surface of the blade body to a radially inward facing interior surface of the blade body. A distance extending from the radially outward facing interior surface of the blade body to the bulkhead rib may be between 15% and 45% of the length of the cavity.

In various embodiments, the blade body may further comprise a fourth rib extending from the first interior surface of the blade body, a fifth rib extending from the first interior surface of the blade body, and a sixth rib extending from the second interior surface of the blade body. The sixth rib may be located between the fourth rib and the fifth rib. In various embodiments, a first distance between the first rib and the second rib, as measured along a chord of the blade, may be less than a second distance between the first rib and the fourth rib, as measured along the chord of the blade. In various embodiments, a first distance between the first rib and the third rib, as measured along a chord of the blade, may be less than a second distance between the first rib and the sixth rib, as measured along the chord of the blade.

A fan section of a gas turbine engine is also provided. The fan section may comprise a fan disk configured to rotate about an axis, and a blade coupled to the fan disk. The blade may comprise a cavity defined, at least partially, by a first interior surface of the blade and by a second interior surface of the blade opposite the first interior surface of the blade. The blade may further comprise a first rib extending from the first interior surface of the blade, a second rib extending from the second interior surface of the blade, and a viscoelastic material disposed in the cavity between the first rib and the second rib and the third rib.

In various embodiments, the first rib may terminate prior to the second interior surface of the blade, and the second rib may terminate prior to the first interior surface of the blade. The blade may further comprise a bulkhead rib traversing the cavity. The first rib and the second rib may be located radially inward of the bulkhead rib.

In various embodiments, the cavity may comprise a length extending from a radially inward facing interior surface of the blade to a radially outward facing interior surface of the blade, and a distance extending from the radially outward facing interior surface of the blade to the bulkhead rib may be between 15% and 45% of the length of the cavity. In various embodiments, the blade may further comprise a third rib contacting the first interior surface and the second interior surface.

In various embodiments, the blade may further comprise a third rib extending from the first interior surface. The second rib may be located between the first rib and the third rib. The blade may further comprise a fourth rib extending from the first interior surface of the blade and located adjacent to the first rib, a fifth rib extending from the first interior surface of the blade, and a sixth rib extending from the second interior surface of the blade. The sixth rib may be located between the fourth rib and the fifth rib. A first distance between the first rib and the third rib, as measured along a chord of the blade, may be less than a second distance between the first rib and the fourth rib, as measured along the chord of the blade.

A method of making a fan blade for a gas turbine engine is also provided. The method may comprise forming a blade body, depositing a viscoelastic material into the radially inward portion of the cavity, and curing the viscoelastic material. The blade body may comprise a cavity defined, at least partially, by a first interior surface of the blade body and a second interior surface of the blade body. The blade body may further comprise a first rib extending from the first interior surface of the blade body, a second rib extending from the second interior surface, and a bulkhead rib traversing the cavity. The bulkhead rib may separate a radially inward portion of the cavity from a radially outward portion of the cavity.

In various embodiments, curing the viscoelastic material may comprise heating the blade body. In various embodiments, the first rib may terminate prior to the second interior surface. The second rib may terminate prior to the first interior surface. In various embodiments, depositing the viscoelastic material into the radially inward portion of the cavity may comprise forming a channel extending from a root of the blade to the cavity, and depositing the viscoelastic material through the channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "distal" refers to the direction outward, or generally, away from the axis of rotation of a turbine engine. As used herein, "proximal" refers to a direction inward, or generally, towards the axis of rotation of a turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to references other than the engine central longitudinal axis.

Figure 1:
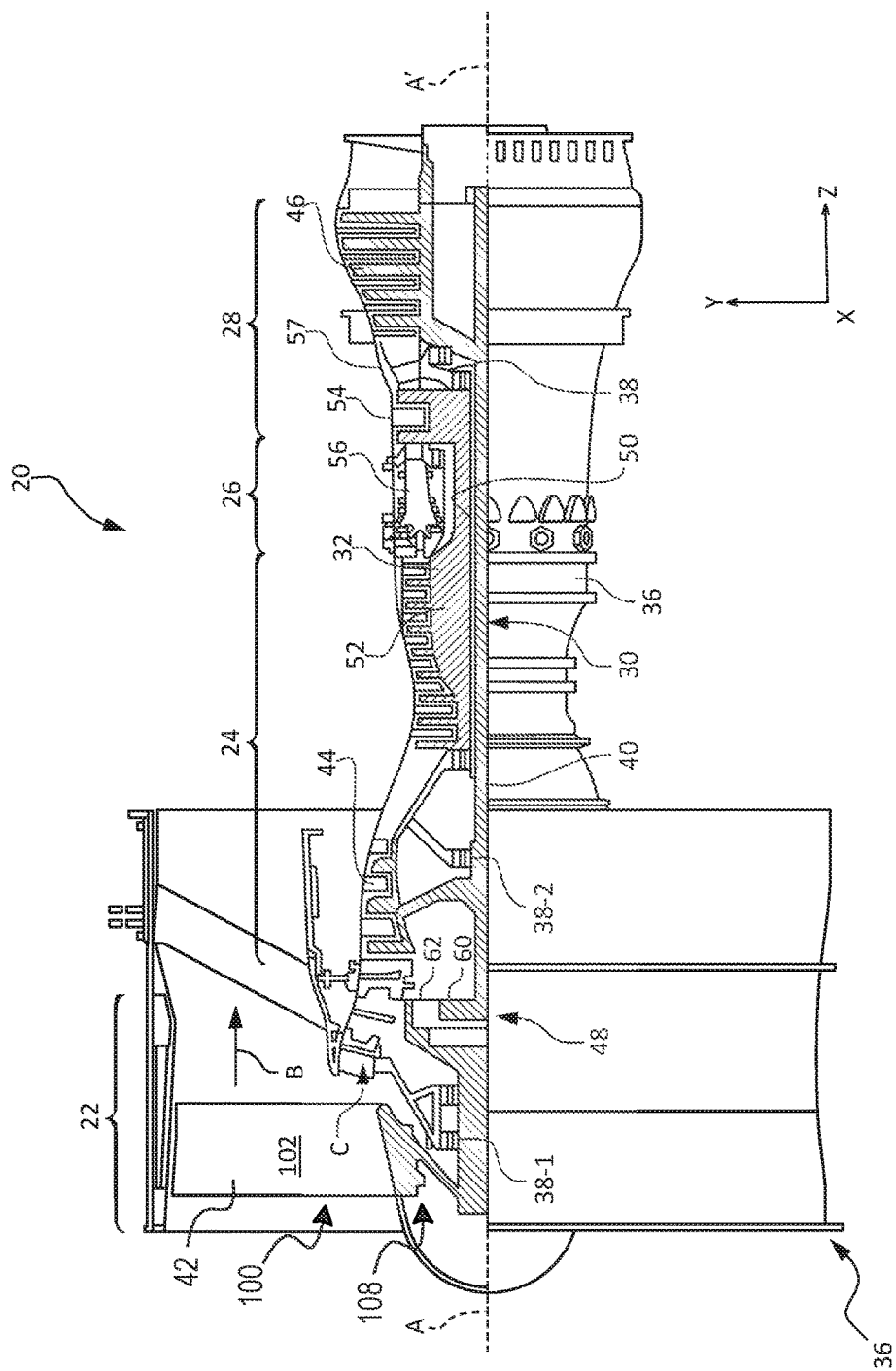
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A'-A relative to an engine static structure 36 or engine case via several bearing systems 38, 38-1, and 38-2. Engine central longitudinal axis A'-A is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A'-A, which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

The fan section 22, the compressor section 24 and the turbine section 28 may each comprise rotor systems including blade assemblies having one or more sets of rotating blades, which may rotate about engine central longitudinal axis A'-A.

Fan section 22 may comprise fan 42 including a blade assembly 100. Blade assembly 100 may comprise a plurality of rotating blades or fan blades 102 coupled to a disk or fan disk 108, which may be configured to rotate about engine central longitudinal axis A'-A. Disk 108 may be centered on the rotation axis of the gas turbine engine with a plurality of blades 102 attached to the disk 108 and spaced apart in the circumferential or tangential direction.

Figure 2:
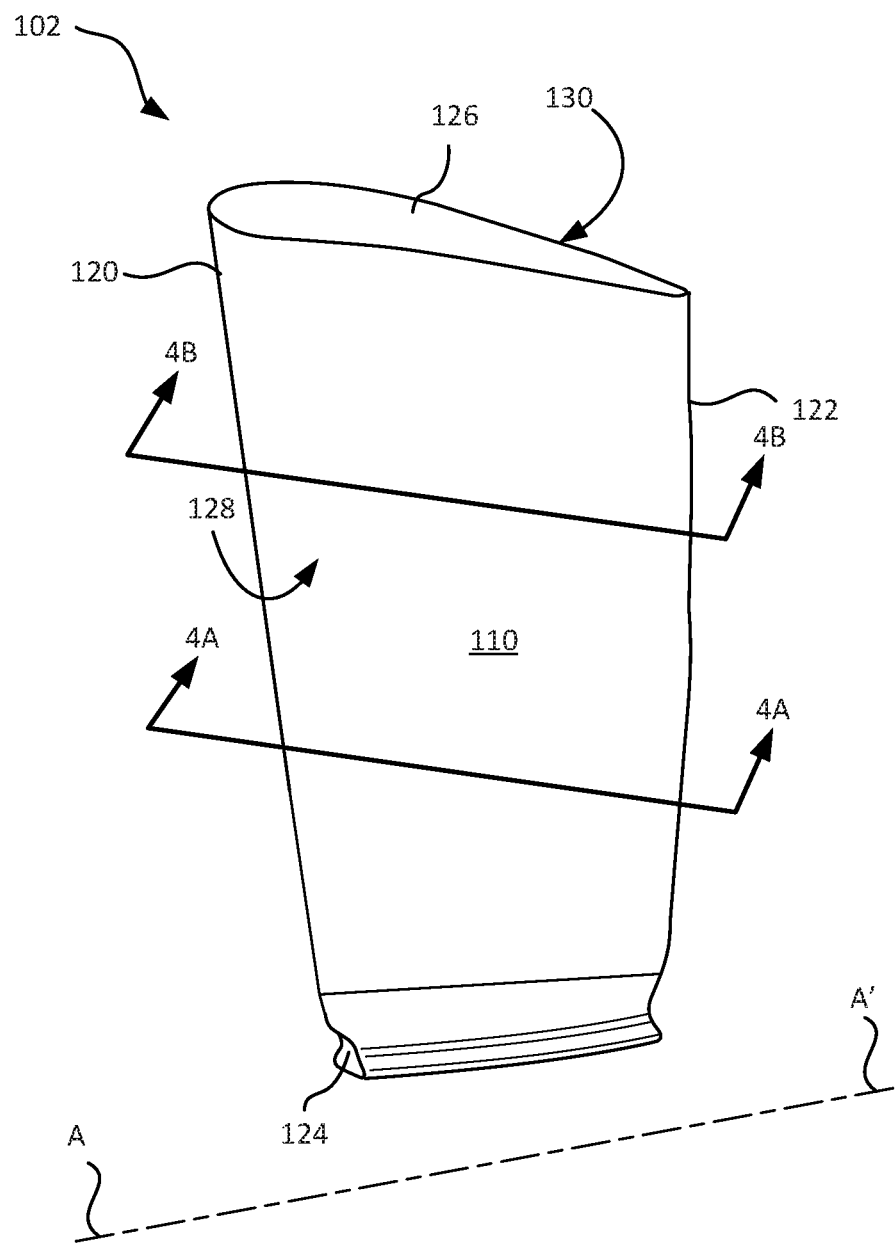
FIG. 2 illustrates an exemplary blade, in accordance with various embodiments.

With reference to FIG. 2, a blade 102 for a gas turbine engine is shown in additional detail, in accordance with various embodiments. Blade 102 may include a blade body 110 having a leading edge 120 and a trailing edge 122. Blade 102 may include a hub end or root 124, which may attach to a disk (e.g., disk 108 in FIG. 1), and a radially outer edge or tip 126 located radially outward from the root 124. The leading edge 120 and trailing edge 122 may extend from root 124 to tip 126 of blade 102, with root 124 being located radially inward with respect to blade body 110 and tip 126 being located radially outward with respect to blade body 110. Blade 102 may further include a generally concave pressure side 128 and a generally convex suction side 130 joined together at the respective leading edge 120 and trailing edge 122. Blade 102 may be fabricated from titanium, a titanium alloy, aluminum, aluminum alloy, composite material or other suitable structural material(s).

Figure 3A:
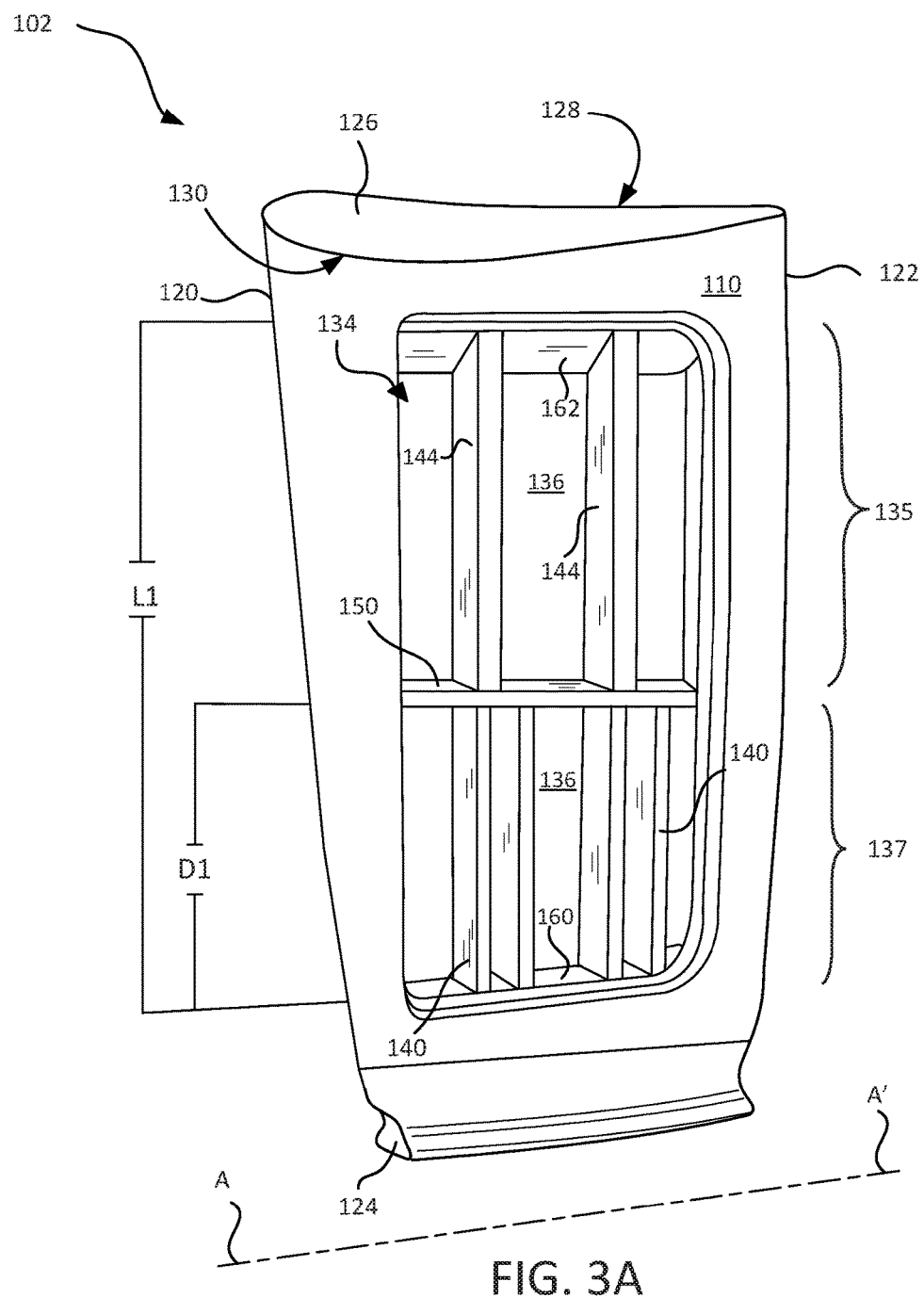
FIGS. 3A and 3B illustrate ribs extending from opposing interior surfaces of a blade, in accordance with various embodiments.
Figure 3B:
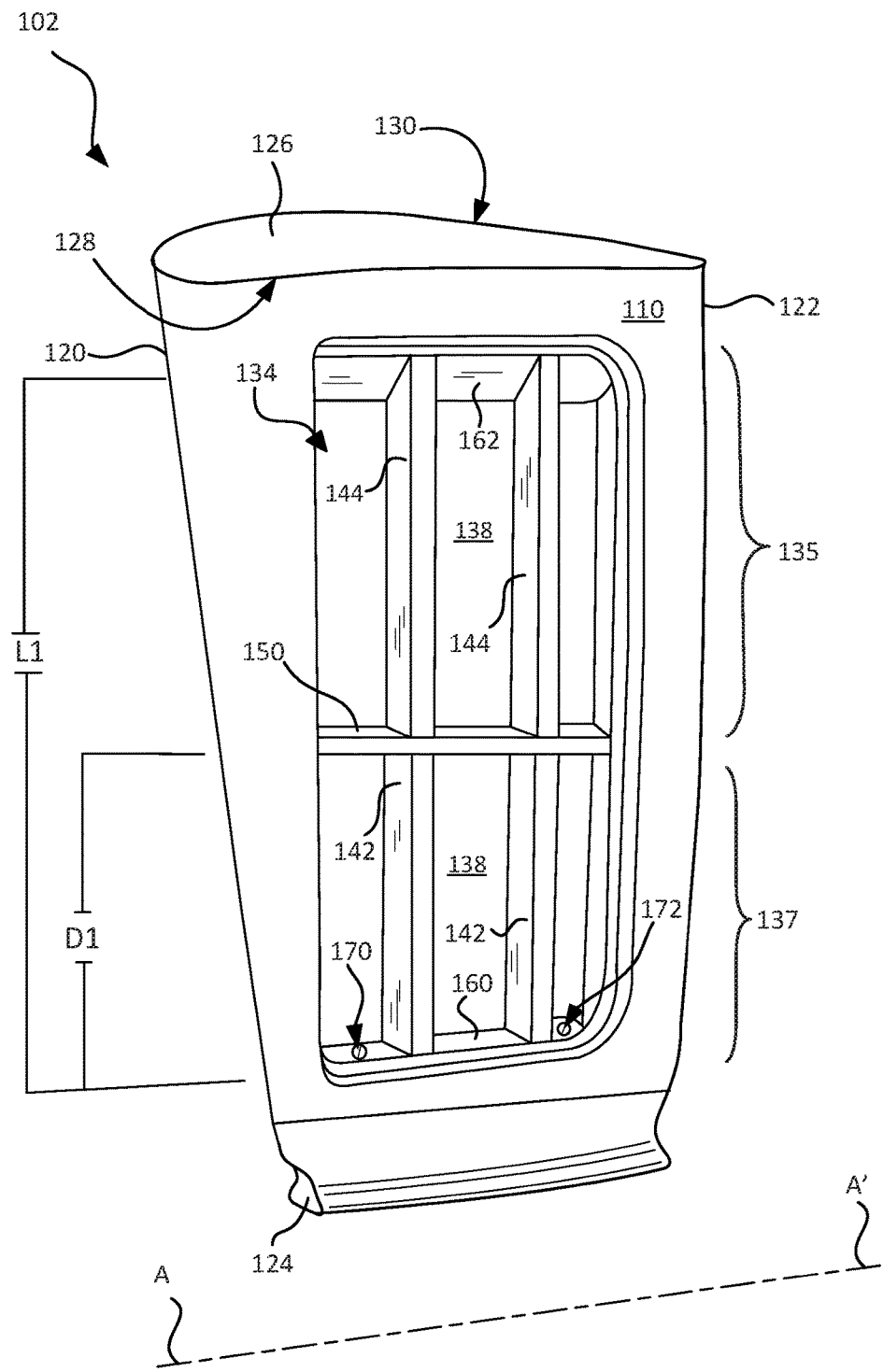

Referring to FIGS. 3A and 3B, FIG. 3A shows a perspective view of a first interior surface 136 of blade 102 with a portion of suction side 130 removed to illustrate the interior structures of blade 102. FIG. 3B shows a perspective view of a second interior surface 138 of blade 102 with a portion of pressure side 128 removed to illustrate the interior structures of blade 102. In various embodiments, to reduce a weight of blade 102, one or more cavities 134 may be formed through blade body 110. Cavity 134 may be defined at least partially by a first interior surface 136 of blade body 110 and a second interior surface 138 of blade body 110 opposite first interior surface 136. First interior surface 136 may be oriented generally toward second interior surface 138. First interior surface 136 may be generally opposite pressure side surface 128 of blade 102. Second interior surface 138 may be generally opposite suction side surface 130 of blade 102. Stated differently, the pressure side wall of blade 102 includes surfaces 128 and 136, and the suction side wall of blade 102 includes surfaces 128 and 138. Cavity 134 may be further defined by a radially outward facing interior surface 160 of blade 102 and a radially inward facing interior surface 162 of blade 102. Radially outward facing interior surface 160 may be oriented generally toward radially inward facing interior surface 162. Radially outward facing interior surface 160 may be located proximate root 124. Radially inward facing interior surface 162 may be located proximate tip 126. Thus, blade 102 may be a hollow or partially hollow aerodynamic structure.

Blade 102 may include a bulkhead rib 150. Bulkhead rib 150 may extend from first interior surface 136 to second interior surface 138. Bulkhead rib 150 may be integral with first interior surface 136 and second interior surface 138. Stated differently, bulkhead rib 150 may be connected to first interior surface 136 and second interior surface 138. Bulkhead rib 150 may extend in an axial direction from an area proximate leading edge 120 to an area proximate trailing edge 122.

Bulkhead rib 150 may traverse cavity 134. Stated differently, bulkhead rib 150 may separate cavity 134 into a first portion 135 radially outward of bulkhead rib 150, and a second portion 137 radially inward of bulkhead rib 150. Cavity 134 comprises a length L1 extending from radially outward facing interior surface 160 to radially inward facing interior surface 162. Bulkhead rib 150 may be located a distance D1 from radially outward facing interior surface 160. In various embodiments, distance D1 is between 5% and 60% of length L1. In various embodiments, distance D1 is between 15% and 45% of length L1. In various embodiments, distance D1 is between 25% and 40% of length L1.

Blade 102 may include a plurality of first ribs 140 extending from first interior surface 136 toward second interior surface 138. Blade 102 may further include a plurality of second ribs 142 extending from second interior surface 138 toward first interior surface 136. First ribs 140 and second ribs 142 may be located in the radially inward portion 137 of cavity 134 (i.e., radially inward of bulkhead rib 150).

Figure 4A:
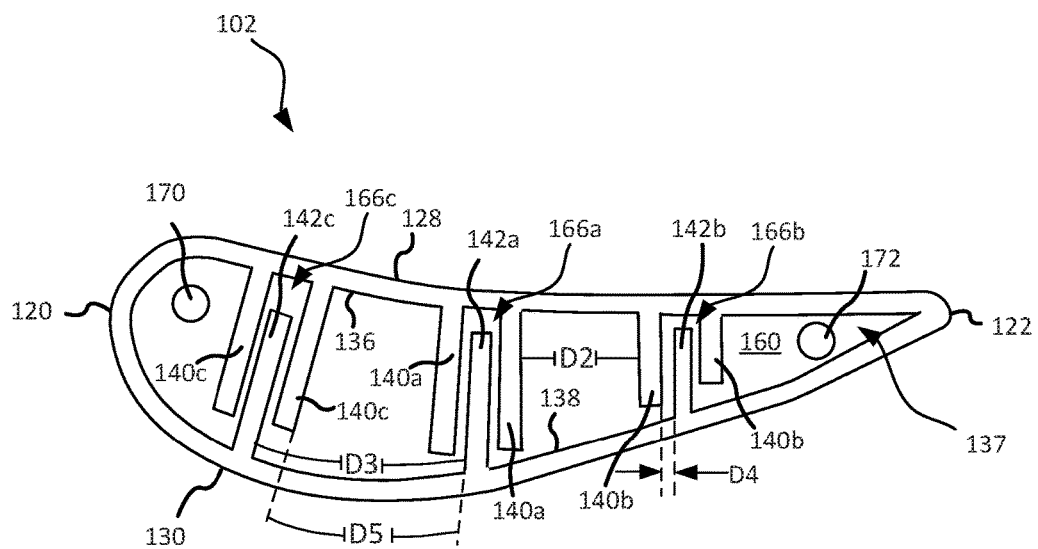
FIG. 4A illustrates a cross-sectional view of a blade taken along line 4A-4A of FIG. 2, in accordance with various embodiments.

With reference to FIG. 4A, a radially inward looking view of a cross-section of blade 102 taken along the line 4A-4A in FIG. 2 is illustrated. The cross-section illustrated in FIG. 4A is radially inward of bulkhead rib 150. First ribs 140 may terminate prior to second interior surface 138. Stated differently, a space or gap may be located between second interior surface 138 and first ribs 140. Second ribs 142 may terminate prior to first interior surface 136. Stated differently, a space or gap may be located between first interior surface 136 and second ribs 142.

In various embodiments, first ribs 140 and second ribs 142 may be configured such that each second rib 142 is located between a pair of first ribs 140. Stated differently, a second rib 142a may be located in a channel 166a that is defined, at least partially, by a pair of first ribs 140a and first interior surface 136. A second rib 142b may be located in a channel 166b that is defined, at least partially, by a pair of first ribs 140b and first interior surface 136. A second rib 142c may be located in a channel 166c that is defined, at least partially, by a pair of first ribs 140c and first interior surface 136.

While three sets of opposing ribs (i.e., ribs 140a/142a, ribs 140b/142b, and ribs 140c/142c) are illustrated, radially inward portion 137 of cavity 134 may include any number of opposing ribs sets. For example, blade 102 may include one opposing rib set (e.g., ribs 140a/142a) or blade 102 may include, for example, five opposing ribs set. The selection of the number of opposing ribs sets, the spacing between opposing ribs (e.g., between first rib 140a and second rib 142a), and the spacing between adjacent sets of opposing ribs (e.g., between ribs 140a/142a and ribs 140b/142b) may be tuned in response to weight constraints, the footprint of blade 102 and/or cavity 134, the susceptibility of a particular area of blade 102 to vibration at select operating frequencies, and/or other operating and manufacturing concerns.

Figure 8A:
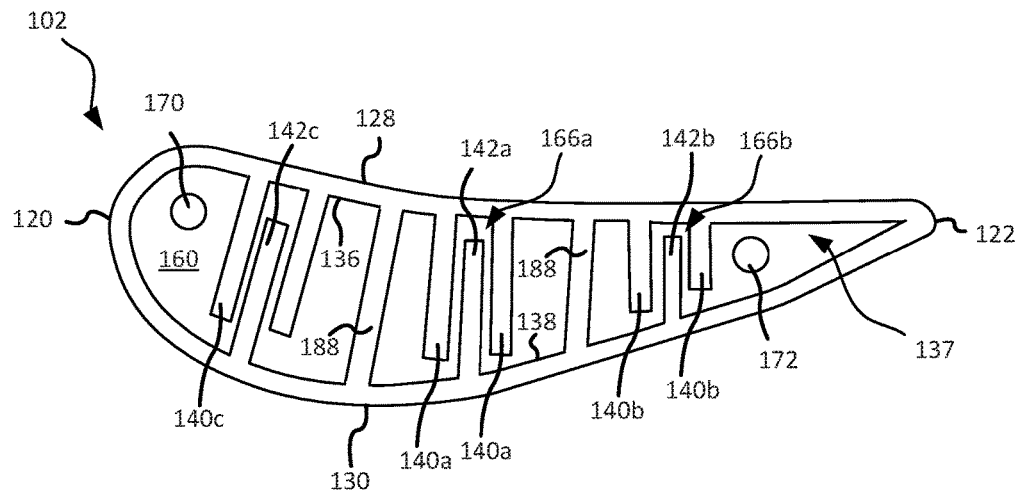
FIGS. 8A and 8B illustrate radially inward looking cross-sectional views of a blade, in accordance with various embodiments.

In various embodiments, with reference to FIG. 8A, blade 102 may comprise one or more connecting rib(s) 188. Connecting rib(s) 188 may be integral with, or otherwise connected to, first interior surface 136 and second interior surface 138. Connecting rib(s) 188 may be located in the radially inward portion 137 of cavity 134. Stated differently, connecting rib(s) 188 may be located radially inward of bulkhead rib 150 (FIG. 3A).

Returning to FIG. 4A, in various embodiments, first ribs 140 and second ribs 142 are configured to minimize a distance D4 between opposing first ribs 140 and second ribs 142. For example, first ribs 140b and second rib 142b are configured to minimize distance D4 between second rib 142b and each of the first ribs 140b. In various embodiments, the distance between first ribs 140a (i.e., the width of channel 166a) may be less than a distance D2 between first rib 140a and the adjacent first rib 140b, as measured along a chord of blade 102. The distance D4 between the second rib 142b and each of the first ribs 140b, as measured along the chord of blade 102, may be less than the distance D2 between first rib 140a and the adjacent first rib 140b. The distance between second rib 142b and each of the first ribs 140b, as measured along the chord of blade 102, may also be less than a distance D3 between second ribs 142a and 142c, and a distance D5 between first rib 140c and second rib 142, as measured along the chord of blade 102. In other words, a first rib 140 (e.g., first rib 140c) may be located more proximate to a first opposing second rib 142 that is adjacent to the first rib 140 (e.g., second rib 142c) as compared to a second opposing second rib 142 that is also adjacent to the first rib 140 (e.g. second rib 142a). Minimizing a distance between selected opposing ribs 140 and 142 tends to reduce vibration of blade 102, as it reduces an amount or thickness of viscoelastic material, as discussed in further detail below, between the opposing ribs.

Figure 8B:
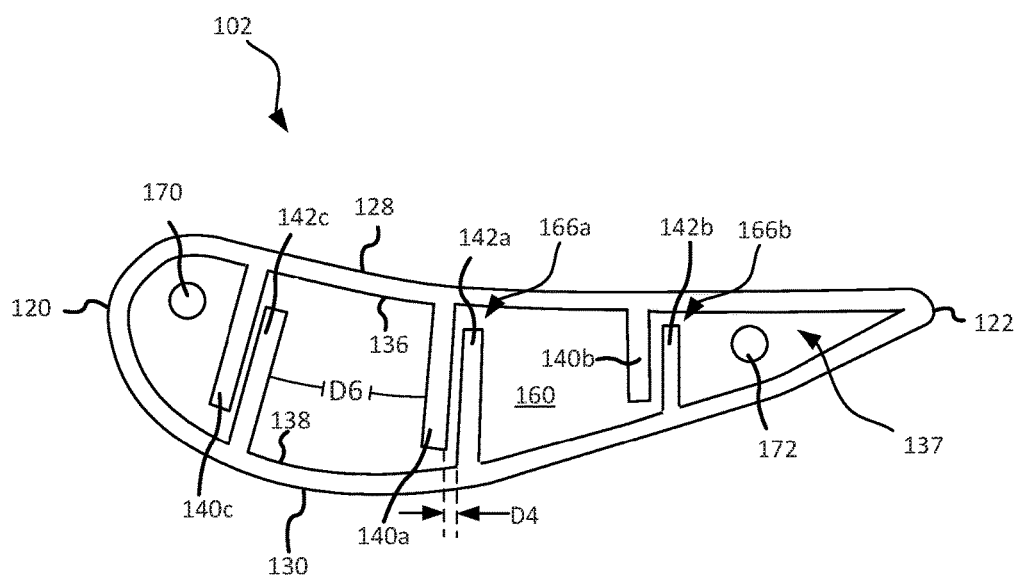

With reference to FIG. 8B, in various embodiments, first ribs 140 and second ribs 142 may be configured such that a single first rib 140 is located proximate a single second rib 142. For example, first rib 140a may be located more proximate the adjacent second rib 142a as compared to the adjacent second rib 142c. Stated differently, distance D4 between first rib 140a and second rib 142a is less that distance D6 between first rib 140a and second rib 142c.

Figure 4B:
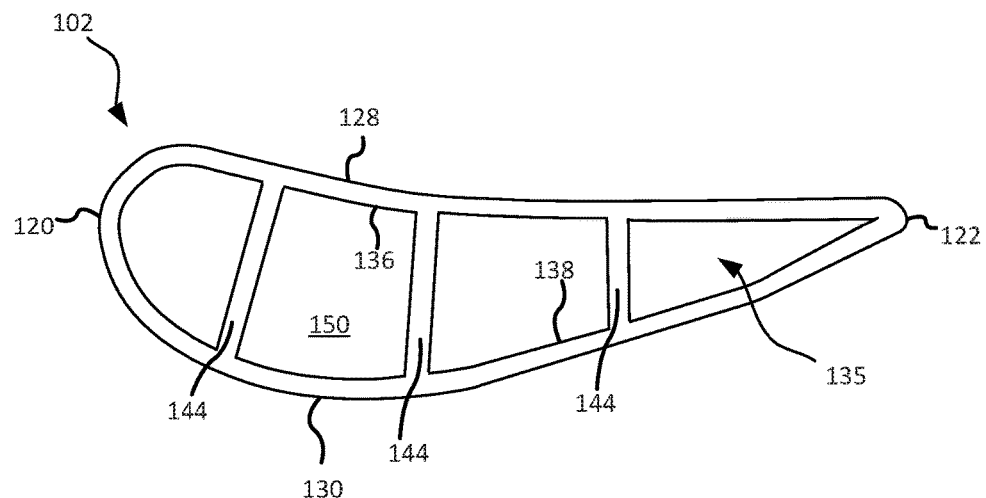
FIG. 4B illustrates a cross-sectional view of a blade taken along line 4B-4B of FIG. 2, in accordance with various embodiments.

Returning to FIGS. 3A and 3B, blade 102 may further include a plurality of radially outward ribs 144. Radially outward ribs 144 may be located in the radially outward portion 135 of cavity 134 (i.e., radially outward of bulkhead rib 150). With reference to FIG. 4B, a radially inward looking view of a cross-section of blade 102 taken along line 4B-4B in FIG. 2 is illustrated. The cross-section illustrated in FIG. 4B is radially outward of bulkhead rib 150. Radially outward ribs 144 may be integral with, or otherwise connected to, first interior surface 136 and second interior surface 138.

With reference to FIG. 3B and FIG. 4A, an opening or channel 170 may extend from an exterior of blade 102 to the radially inward portion 137 of cavity 134. In various embodiments, channel 170 may be formed through root 124 and radially outward facing interior surface 160. An opening or vent 172 may extend from the exterior of blade 102 to the radially inward portion 137 of cavity 134. In various embodiments, vent 172 may be formed through root 124 and radially outward facing interior surface 160.

Figure 5:
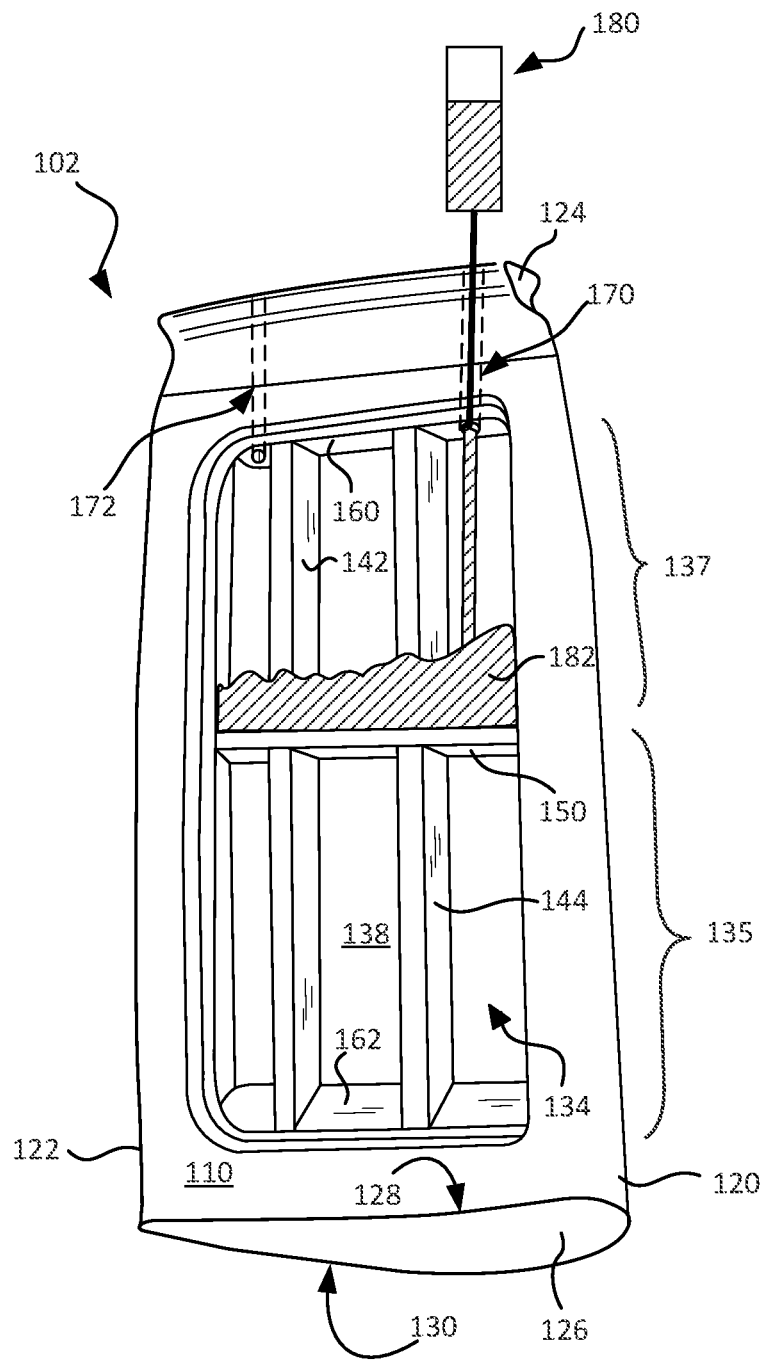
FIG. 5 illustrates a viscoelastic material being deposited into a blade, in accordance with various embodiments.

With reference to FIG. 5, a deposition system 180 may deposit viscoelastic material 182 through channel 170 into cavity 134. At deposition, viscoelastic material 182 may comprise a relatively low viscosity, which allows viscoelastic material 182 to flow through channel 170 and around ribs 140 and 142, with momentary reference to FIG. 6A. Bulkhead rib 150 may function as a dam and may prevent viscoelastic material 182 from flowing into radially outward portion 135 of cavity 134. As viscoelastic material 182 is deposited into the radially inward portion 137 of cavity 134, air may exit the radially inward portion 137 of cavity 134 through vent 172.

Figure 6A:
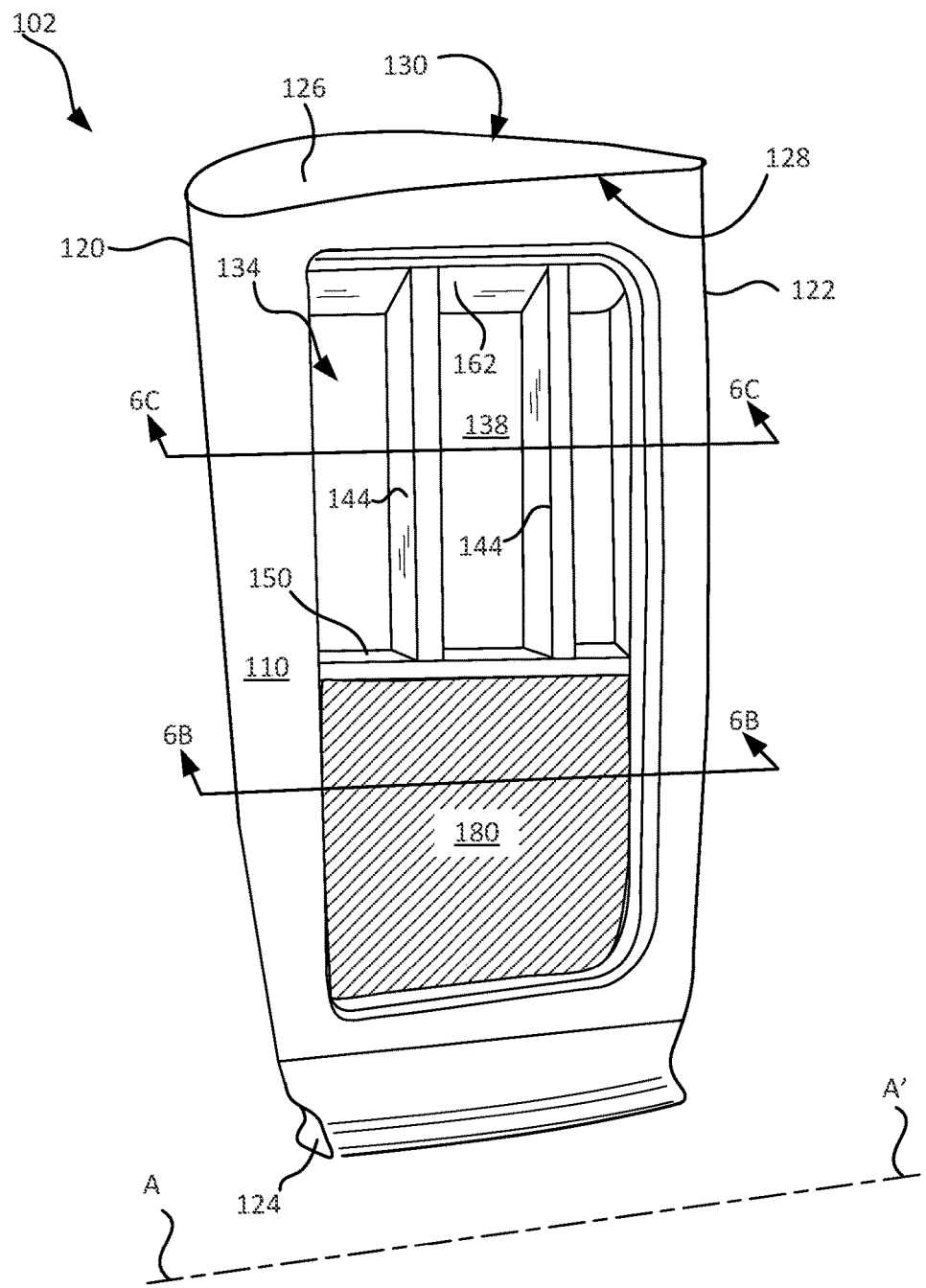
FIG. 6A illustrates a blade having viscoelastic material deposited therein, in accordance with various embodiments.
Figure 6B:
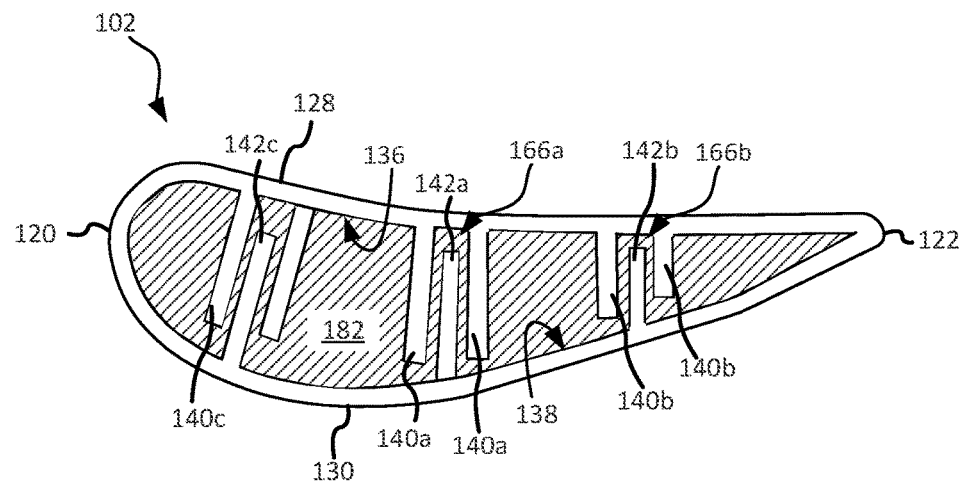
FIG. 6B illustrates a cross-sectional view of a blade with viscoelastic material taken along line 6B-6B of FIG. 6A, in accordance with various embodiments.

With combined reference to FIG. 5 and FIG. 6B, the space between first ribs 140 and second interior surface 138 and the space between second ribs 142 and first interior surface 136, in combination with the low viscosity of viscoelastic material 182, allows viscoelastic material 182 to flow between first ribs 140 and second ribs 142. Stated differently, viscoelastic material 182 may flow axially between leading edge 120 and trailing edge 122 by flowing through the channels (e.g., channels 166a, 166b, and 166c) defined by first ribs 140 and first interior surface 136.

In various embodiments, viscoelastic material 182 may comprise a viscoelastic polymer possessing a relatively high loss factor for a selected frequency and temperature. In various embodiments, viscoelastic material 182 may comprise a polyurethane elastomer. In various embodiments, the polyurethane elastomer may be formed through a reaction of a diisocyanate with a polyol.

The material of viscoelastic material 182 may be tailored to have a relatively high damping ratio or loss factor at a particular preselected operating frequency and within a particular temperature range. For example, in various embodiments, the loss factor of the viscoelastic material may be configured to be as high as possible at a selected temperature and frequency of interest. The frequency of interest may be a frequency at which the blade experiences increased vibration. In various embodiments, the loss factor of the viscoelastic material may be configured to fall within a selected range at a selected temperature and frequency of interest. In one example, the shear loss factor of the viscoelastic material may be configured to be greater than or equal to 0.5, greater than or equal to 1.0, or greater than or equal to 1.5. The frequency range of interest may be selected between about 1 Hz to about 100,000 Hz, about 10 Hz to about 10,000 Hz, about 50 Hz to about 500 Hz. The temperature range of interest may be between about −50° C. to about 250° C., about −50 to about 100° C., about −5° C. to about 40° C., about 5° C. to about 30° C.

In various embodiments, viscoelastic material 182 may be cured by heating blade body 110 prior to, during, and/or after deposition of viscoelastic material 182. In various embodiments, blade body 110 may be heated to between 130° F. and 300° F. (i.e., between 54.4° C. and 148.9° C.). In various embodiments, blade body 110 may be heated to between 150° F. and 250° F. (i.e., between 65.6° C. and 121.1° C.). In various embodiments, blade body 110 may be cured for between 15 minutes to 5 hours. In various embodiments, blade body 110 may be cured for between 30 minutes to 2 hours. During curing, viscoelastic material 182 undergoes a chemical reaction which increases a viscosity of the viscoelastic material 182 causing viscoelastic material 182 to change from a liquid into a solid viscoelastic material.

Figure 6C:
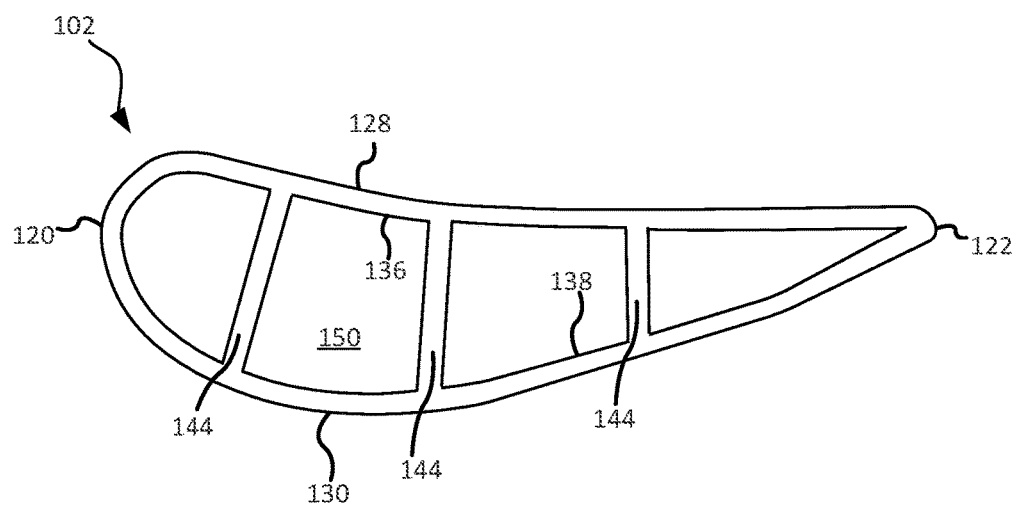
FIG. 6C illustrates a cross-sectional view of a blade with viscoelastic material taken along line 6C-6C of FIG. 6A, in accordance with various embodiments.

FIGS. 6A, 6B, and 6C show blade 102 after deposition and curing of viscoelastic material 182. Viscoelastic material 182 may be disposed between first ribs 140 and second ribs 142. Viscoelastic material 182 may also be disposed between first ribs 140 and second interior surface 138 and between second ribs 142 and first interior surface. As shown in FIG. 6C, bulkhead rib 150 may prevent viscoelastic material 182 from flowing into radially outward portion 135 of cavity 134. Locating viscoelastic material 182 between first and second ribs which are in close proximity to one another (e.g., between first ribs 140a and second rib 142a, and between first ribs 140b and second rib 142b), may provide a robust damping structure within blade 102, which may decrease vibration and/or flutter of blade 102.

Opposing ribs 140 and 142 may put the viscoelastic material 182 located between the opposing ribs 140 and 142 into shear deformation and thereby exercise the damping material. The thickness of the viscoelastic material 182, as sandwiched between opposing ribs 140 and 142 (e.g., viscoelastic material 182 located between first ribs 140a and second rib 142a), as well as the modulus of the viscoelastic material 182 may be selected to drive a sufficient amount of strain energy into the viscoelastic material 182. Stated differently, the number, size, and location of ribs 140 and 142, and the material properties of viscoelastic material 182 (e.g., the loss factor and/or the dynamic modulus of viscoelastic material 182) may be selected to drive a sufficient amount of strain energy into viscoelastic material 182 during deformation in the vibrational mode(s) of interest (i.e., during a selected frequency and temperature at which blade 102 experience vibration).

Figure 6D:
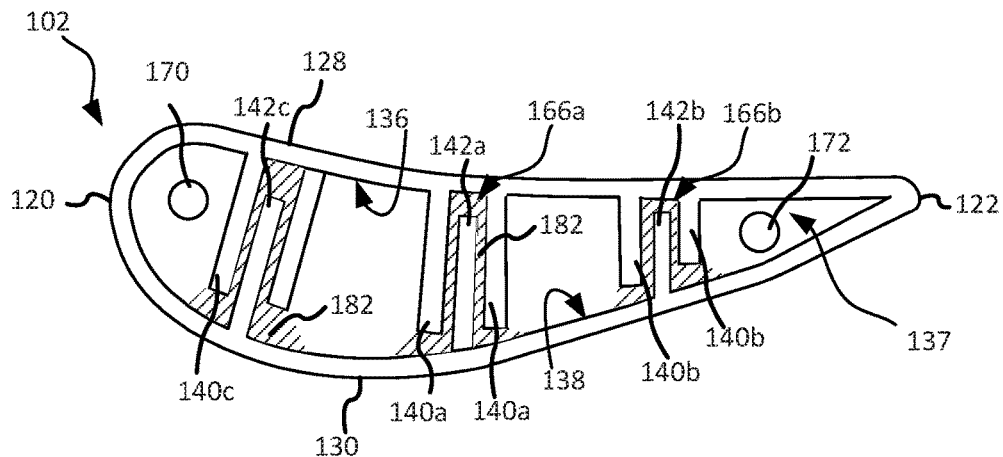
FIG. 6D illustrates a cross-sectional view of a blade with viscoelastic material, in accordance with various embodiments.

With reference to FIG. 6D, in various embodiments, the deposition viscoelastic material 182 is controlled such that viscoelastic material 182 is between first and second ribs which are in close proximity to one another. For example, viscoelastic material 182 may be deposited between first ribs 140a and second rib 142a, between first ribs 140b and second ribs 142b, and between first ribs 140c and second ribs 142c, and the area between adjacent first ribs 140a, the area between adjacent first ribs 140b and 140a and 140c, the area between adjacent second ribs 142a and 142b, and the area between adjacent second ribs 142a and 142c is left devoid of viscoelastic material 182. Depositing viscoelastic material 182 only between first and second ribs which are in close proximity to one another may decrease an overall weight of blade 102.

Figure 9A:
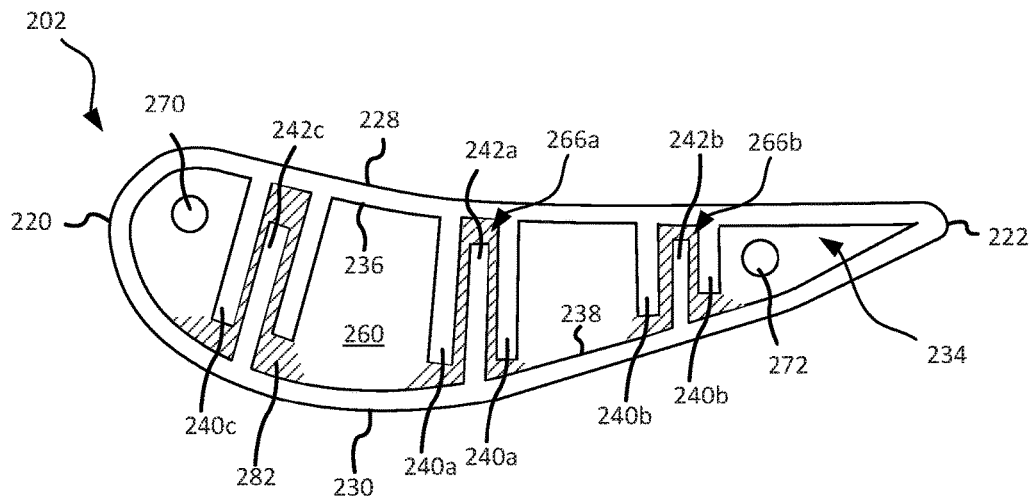
FIGS. 9A and 9B illustrate, respectively, a radially inward looking cross-sectional view of a blade and a radially outward looking cross-sectional view of a blade having viscoelastic material deposited therein, in accordance with various embodiments.
Figure 9B:
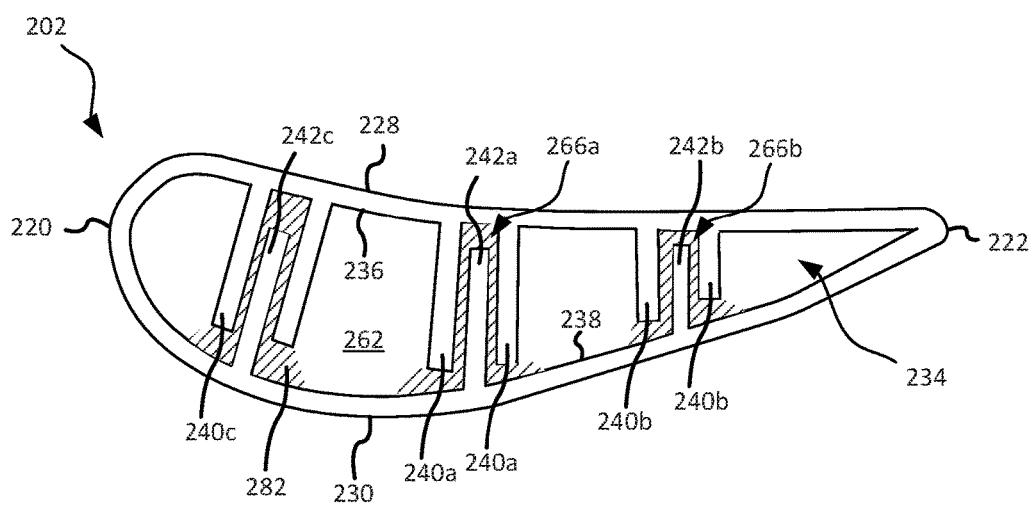

With reference to FIGS. 9A and 9B, a blade 202, similar to blade 102 in FIG. 2, is illustrated according to various embodiments. Blade 202 comprises a leading edge 220, a trailing edge 222, a pressure side surface 228, a suction side surface 230. Blade 202 further comprises a first interior surface 136 opposite pressure side surface 228, and a second interior surface 138 opposite suction side surface 230. Blade 202 further comprises a radially outward facing interior surface 260 proximate a root of blade 202, and a radially inward facing interior surface 262 proximate a tip of blade 202. One or more cavities 234 may be formed through blade 102. Cavity 234 may be defined at least partially by a first interior surface 236, second interior surface 238, radially outward facing interior surface 260, and radially inward facing interior surface 262.

Blade 202 may include a plurality of first ribs 240 extending from first interior surface 236 toward second interior surface 238. First ribs 240 may terminate prior to second interior surface 238. Stated differently, a space or gap may be located between second interior surface 238 and first ribs 240.

Blade 202 may further include a plurality of second ribs 242 extending from second interior surface 238 toward first interior surface 236. Second ribs 242 may terminate prior to first interior surface 236. Stated differently, a space or gap may be located between first interior surface 236 and second ribs 242.

In various embodiments, first ribs 240 and second ribs 242 may be configured such that each second rib 242 is located between a pair of first ribs 240. For example, a second rib 242a may be located in a channel 266a that is defined, at least partially, by a pair of first ribs 240a and first interior surface 236. A second rib 242b may be located in a channel 266b that is defined, at least partially, by a pair of first ribs 240b and first interior surface 236. A second rib 242c may be located in a channel 266c that is defined, at least partially, by a pair of first ribs 240c and first interior surface 236.

Cavity 234 may include a length, similar to length L1 in FIG. 3A, extending from radially outward facing interior surface 260 to radially inward facing interior surface 262. In various embodiments, first ribs 240 and second ribs 242 may extend from radially outward facing interior surface 260 to radially inward facing interior surface 262. Stated differently, in various embodiments, a radial length of first ribs 240 and second ribs 242 may be equal to the length of cavity 234. In various embodiments, a radial length of first ribs 240 and second ribs 242 may be between 80% and 95% of the length of cavity 234. In various embodiments, a radial length of first ribs 240 and second ribs 242 may be between 50% and 80% of the length of cavity 234.

A viscoelastic material 282, similar to viscoelastic material 182 in FIG. 5, may be deposited into cavity 234 through a deposit channel 270 formed through radially outward facing interior surface 260. At deposition, viscoelastic material 282 may comprise a relatively low viscosity, which allows viscoelastic material 282 to flow through channel 270 and around ribs 240 and 242. As viscoelastic material 282 is deposited into cavity 234, air may exit cavity 234 through a vent 272 formed through radially outward facing interior surface 260. The deposition of viscoelastic material 282 may be controlled such that viscoelastic material 282 is located between first and second ribs which are in close proximity to one another, while other areas are left devoid of viscoelastic material 282. In various embodiments, viscoelastic material 282 may fill cavity 234.

Figure 7:
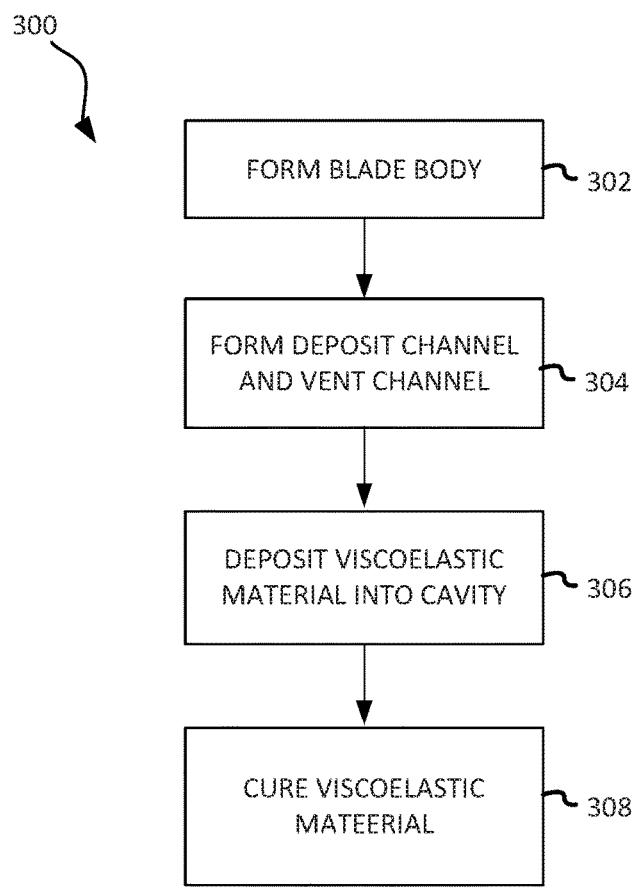
FIG. 7 illustrates a method making a blade having damping structures, in accordance with various embodiments.

With reference to FIG. 7, a method 300 of making a blade for a gas turbine engine is shown, in accordance with various embodiments. Method may comprise forming a blade body (step 302). In various embodiments, the blade body may comprise a cavity defined at least partially by a first interior surface of the blade body and a second interior surface of the blade body. The blade body may further comprise a first rib extending from the first interior surface of the blade body, a second rib extending from the first interior surface, and a third rib extending from the second interior surface. The third rib may be located between the first rib and the second rib. The blade body may further comprise a bulkhead rib traversing the cavity. The bulkhead rib may separate a radially inward portion of the cavity from a radially outward portion of the cavity. In various embodiments, method 300 may further comprise forming a channel and a vent extending from a root of the blade to the cavity (step 304).

Method 300 may further comprise depositing a viscoelastic material into the radially inward portion of the cavity (step 306). In various embodiments, step 306 may comprise depositing the viscoelastic material through the channel. Method 300 may further comprise curing the viscoelastic material (step 308). In various embodiments, step 308 may comprise heating the blade body.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade comprising:
   a blade body, the blade body comprising:
      a cavity defined, at least partially, by a first interior surface of the blade body and by a second interior surface of the blade body opposite the first interior surface of the blade body;
      a first rib extending from the first interior surface of the blade body;
      a second rib extending from the first interior surface of the blade body;
      a third rib extending from the second interior surface of the blade body; wherein the third rib is located between the first rib and the second rib; and
      a bulkhead rib traversing the cavity, wherein the bulkhead rib separates a radially inward portion of the cavity from a radially outward portion of the cavity; and
   a viscoelastic material disposed in the radially inward portion of the cavity.

2. The blade of claim 1, wherein the first rib and the second rib terminate prior to the second interior surface, and wherein the third rib terminates prior to the first interior surface, and wherein the first rib, the second rib, and the third rib are radially inward of the bulkhead rib.

3. The blade of claim 2, wherein the blade body further comprises a fourth rib contacting the first interior surface and the second interior surface, and wherein the fourth rib is radially outward of the bulkhead rib.

4. The blade of claim 2, wherein the blade body further comprises a fourth rib contacting the first interior surface and the second interior surface, and wherein the fourth rib is radially inward of the bulkhead rib.

5. The blade of claim 1, wherein the cavity comprises a length extending from a radially outward facing interior surface of the blade body to a radially inward facing interior surface of the blade body, and wherein a distance extending from the radially outward facing interior surface of the blade body to the bulkhead rib is between 15% and 45% of the length of the cavity.

6. The blade of claim 1, wherein the blade body further comprises:
a fourth rib extending from the first interior surface of the blade body;
a fifth rib extending from the first interior surface of the blade body; and
a sixth rib extending from the second interior surface of the blade body, wherein the sixth rib is located between the fourth rib and the fifth rib.

7. The blade of claim 6, wherein a first distance between the first rib and the second rib, as measured along a chord of the blade, is less than a second distance between the first rib and the fourth rib, as measured along the chord of the blade.

8. The blade of claim 6, wherein a first distance between the first rib and the third rib, as measured along a chord of the blade, is less than a second distance between the first rib and the sixth rib, as measured along the chord of the blade.

9. A fan section of a gas turbine engine, comprising:
a fan disk configured to rotate about an axis; and
a blade coupled to the fan disk, the blade comprising:
a cavity defined, at least partially, by a first interior surface of the blade and by a second interior surface of the blade opposite the first interior surface of the blade;
a first rib extending from the first interior surface of the blade;
a second rib extending from the second interior surface of the blade;
a bulkhead rib traversing the cavity, wherein the first rib and the second rib are located radially inward of the bulkhead rib; and
a viscoelastic material disposed in the cavity between the first rib and the second rib.

10. The fan section of claim 9, wherein the first rib terminates prior to the second interior surface of the blade, and wherein second rib terminates prior to the first interior surface.

11. The fan section of claim 9, wherein the cavity comprises a length extending from a radially inward facing interior surface of the blade to a radially outward facing interior surface of the blade, and wherein a distance extending from the radially outward facing interior surface of the blade to the bulkhead rib is between 15% and 45% of the length of the cavity.

12. The fan section of claim 9, wherein the blade may further comprises a third rib contacting the first interior surface and the second interior surface.

13. The fan section of claim 9, wherein the blade further comprises a third rib extending from the first interior surface, wherein the second rib is located between the first rib and the third rib.

14. The fan section of claim 13, wherein the blade further comprises:
a fourth rib extending from the first interior surface of the blade and located adjacent to the first rib;
a fifth rib extending from the first interior surface of the blade; and
a sixth rib extending from the second interior surface of the blade, wherein the sixth rib is located between the fourth rib and the fifth rib.

15. The fan section of claim 14, wherein a first distance between the first rib and the third rib, as measured along a chord of the blade, is less than a second distance between the first rib and the fourth rib, as measured along the chord of the blade.

16. A method of making a blade for a gas turbine engine, comprising:
forming a blade body, the blade body comprising:
a cavity defined at least partially by a first interior surface of the blade body and a second interior surface of the blade body;
a first rib extending from the first interior surface of the blade body;
a second rib extending from the second interior surface; and
a bulkhead rib traversing the cavity, wherein the bulkhead rib separates a radially inward portion of the cavity from a radially outward portion of the cavity;
depositing a viscoelastic material into the radially inward portion of the cavity; and
curing the viscoelastic material.

17. The gas turbine engine of claim 16, wherein curing the viscoelastic material comprises heating the blade body.

18. The gas turbine engine of claim 16, wherein the first rib terminates prior to the second interior surface, and wherein the second rib terminates prior to the first interior surface.

19. The gas turbine engine of claim 16, wherein the depositing the viscoelastic material into the radially inward portion of the cavity comprises:
forming a channel extending from a root of the blade to the cavity; and
depositing the viscoelastic material through the channel.

20. A blade for a gas turbine engine, the blade comprising:
a blade body, the blade body comprising:
a cavity defined, at least partially, by a first interior surface of the blade body and by a second interior surface of the blade body opposite the first interior surface of the blade body;
a first rib extending from the first interior surface of the blade;
a second rib extending from the second interior surface of the blade;
a third rib extending from the first interior surface, wherein the second rib is located between the first rib and the third rib;
a fourth rib extending from the first interior surface of the blade and located adjacent to the first rib;
a fifth rib extending from the first interior surface of the blade; and
a sixth rib extending from the second interior surface of the blade, wherein the sixth rib is located between the fourth rib and the fifth rib, and wherein a first distance between the first rib and the third rib, as measured along a chord of the blade, is less than a second distance between the first rib and the fourth rib, as measured along the chord of the blade.

21. The blade of claim 20, further comprising a viscoelastic material disposed in the cavity between the first rib and the second rib.

* * * * *